United States Patent Office 3,634,414
Patented Jan. 11, 1972

3,634,414
METHINIC DYESTUFFS AND THEIR METHODS
OF PREPARATION
Robert F. M. Sureau, Enghien-les-Bains, Gilbert V. H.
Kremer, Ermont, and Victor M. Dupre, Louvres,
France, assignors to Ugine Kuhlmann, Paris, France
No Drawing. Filed Aug. 9, 1968, Ser. No. 751,347
Claims priority, application France, Aug. 11, 1967,
117,724
Int. Cl. C07d 7/28
U.S. Cl. 260—240 R
9 Claims

ABSTRACT OF THE DISCLOSURE

Dyestuffs are provided which may be represented by the following general formula:

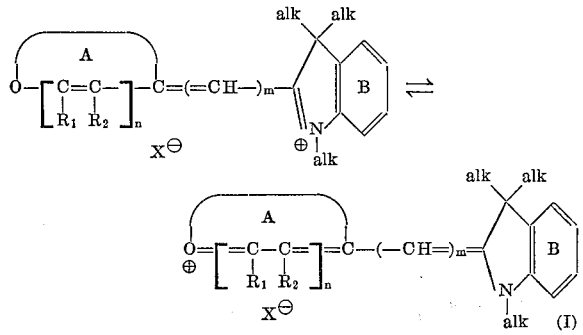

in which the nucleus B is unsubstituted or substituted by at least one halogen atom or alkyl or alkoxy group, alk represents a lower alkyl group which may be the same or different, $m$ is a low odd number, A represents a six-membered ring containing 5 carbon atoms and belonging to a mono- or poly-cyclic system, which is unsubstituted or substituted by at least one non-ionisable substituent, $n$ is 0 or 1, $R_1$ represents a hydrogen atom or an alkyl or phenyl radical, $R_2$ represents a hydrogen atom or an alkyl radical, the arrangement

may also represent a benzene ring in the polycyclic grouping and Y represents a monovalent anion. These dyestuffs are of interest for the dyeing of fibres especially fibres based on acrylonitrile polymers or copolymers and for the photographic industry. Processes for the preparation of the dyestuff are also provided.

The present invention concerns new methinic dyestuffs and processes for their preparation.

The new dyestuffs of this invention may be represented by the following general formulae:

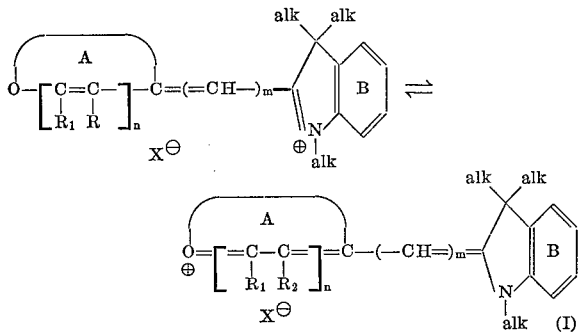

in which the nucleus B may be substituted by at least one halogen atom or alkyl or alkoxy group, alk represents a lower alkyl group, preferably methyl or ethyl, which may be the same or different, $m$ is a low odd number, preferably 1 or 3, A represents a six-membered ring containing 5 carbon atoms and belonging to a mono- or polycyclic system possibly substituted by at least one non-ionisable substituent such as for example a halogen atom or an alkyl, alkoxy, cyano, nitro or phenyl group, $n$ represents 0 or 1, $R_1$ represents a hydrogen atom or an alkyl or phenyl radical, $R_2$ represents a hydrogen atom or an alkyl radical, the arrengement

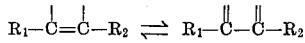

may also represent a benzene ring in the polycyclic grouping, and X represents a monovalent anion. The alkyl and alkoxy groups are preferably lower alkyl and alkoxy groups, that is they preferably contain 1 to 4 carbon atoms.

The synthesis of the dyestuffs of Formula I in which $m=1$ may be effected for example by the condensation of a 1,3,3-trialkyl-2-methylene-indoline of Formula II with a thione of Formula III

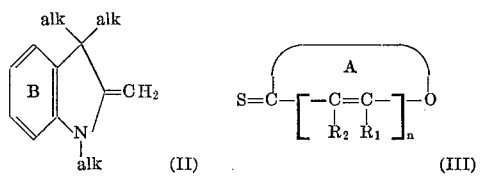

in which alk, A, B, $R_1$, $R_2$ and $n$ have the same significance as above. Examples of thiones of Formula III are 2-coumarinthione (2-thio-coumarin), 4-chromonethione (4-thio-chromone), 2- and 4-pyronethiones, as well as their substituted derivatives. They may be prepared by the action of phosphorus pentasulphide on compounds of the formula:

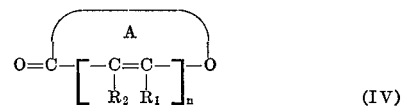

dissolved in the hot in an anhydrous solvent such as for example dioxan.

The condensation of the compounds of Formulae II and III may be effected in solution in a weak organic acid such as for example acetic or propionic acid at a temperature near to boiling which favours the elimination of hydrogen sulphide. In the same medium, the reaction can be greatly accelerated and the yields substantially improved by adding an alkylating agent, preferably in an amount equal to or greater than the stoichiometric quantity. In this case the loss of alkylmercaptan is noted which is probably due to the intermediate formation of a very reactive methylthio-oxonium compound. All the conventional alkylating agents such as for example methyl or ethyl sulphate, alkyl halides, alkyl benzene- or alkyl toluene-sulphonates, and methyl or ethyl chloro- or bromo-acetates, are suitable.

The separation of the dyestuff may be effected, for example, by dilution, filtration in the presence of carbon black to eliminate some impurities, and crystallisation of the filtrate by the addition of sodium chloride and possibly zinc chloride.

The dyestuffs of Formula I in which $m=1$ and $n=0$ may also be prepared for example by condensing, in an anhydrous organic solvent medium, a 1,3,3-trialkyl-2-methylene-indoline of Formula II with an alkoxy-pyrylium derivative of formula

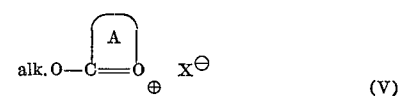

in which alk., A and X have the same significance as above.

In order to prepare the dyestuffs of Formula I in which $m=3$, a 1,3,3-trialkyl-2-formyl-methylene-indoline of Formula VI may for example be condensed with a methyl-pyrylium derivative of Formula VII.

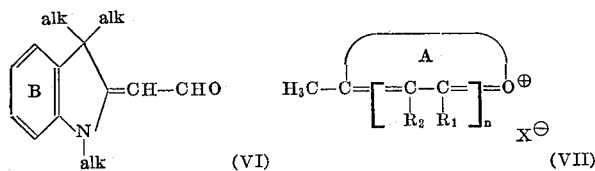

in which alk., A, B, $R_1$, $R_2$, $n$ and X have the meanings given above. This condensation may be carried out for example in a medium of alcoholic or acid organic solvent. Among the pyrylium derivatives of Formula VII may be mentioned, for example, the salts of 2-methyl- and 4-methyl-pyrylium, 2-methyl-4,6 - diphenyl - pyrylium, 4-methyl-2,6-diphenyl-pyrylium, 2-methyl and 4-methyl-benzopyrylium, 2-methyl- and 4-methylnaphthopyrylium and their substituted derivatives.

The new dyestuffs according to the invention cover the whole range of the visible spectrum and are of particular interest for the dyeing of fibres and for the photographic industry.

In dyeing, these dyestuffs show all the properties of the cationic dyestuffs and are particularly suited for the coloration of fibres based on acrylonitrile polymers or copolymers. They possess a very strong affinity for these fibres and impart to them very bright shades ranging from yellow to green-blue, which generally are very uniform and often of remarkable fastness, especially to light. Thus, for example, the dyestuff of the formula:

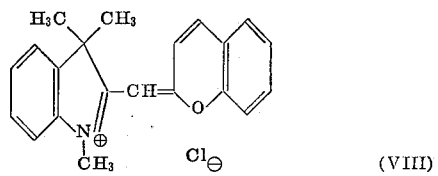

gives on acrylic fibres orange shades of great brilliance which can be marked at more than 7 in Xeno test. This experimental fact was quite unexpected since the methinic dyestuffs known for a long time and of similar structure, but having 2 heterocyclic nitrogen atoms and not oxygen or on the contrary 2 heterocyclic ovygen atoms and no nitrogen are extremely fugitive on exposure to light. The difference is striking when the dyestuff of Formula VIII is compared with its isologue IX and with the pyrylocyanine X of Wizinger (Angew. Chem., 1938, p. 895).

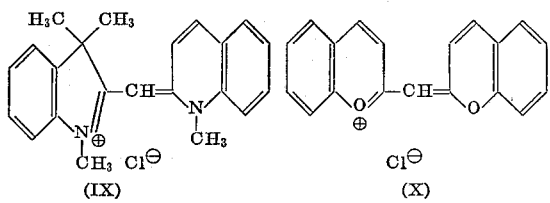

The dyestuffs IX and X provide on acrylic fibres golden yellow and bluish red shades respectively but of which the Xeno test number does not exceed 1–2.

In the following examples, to which the invention is not restricted, the parts are by weight unless the contrary is stated.

EXAMPLE 1

A solution of 15 parts of 2-coumarin-thione and 16 parts of 1,3,3-trimethyl-2-methylene-indoline in 100 parts of acetic acid is heated under reflux. The solution becomes deep orange and evolution of hydrogen sulphide is noted. After boiling for 20 hours, the reaction mixture is allowed to cool and diluted with 400 parts of water. A yellow crystalline precipitate is filtered off which, after rinsing and drying, melts at 98–100° C. and is found to be unaltered 2-coumarin-thione (dry weight: 11.5 parts). On addition of 20 parts of salt to the filtrate, a crystalline precipitate is formed which is recrystallised from boiling water in the presence of a little decolorising charcoal. On cooling the filtrate the dyestuff of Formula VIII crystallises in the form of bronzed red leaflets which are very soluble in cold water and alcohol. Its solutions are bright orange. Dry weight: 4.3 parts.

The mother liquors form the preparation are made alkaline with caustic soda and extracted with ether. The ether extract is distilled after drying and enable the greater part of the unconverted Fischer base to be recovered.

For analysis, a small sample of the dyestuff was again crystallised from boiling water and dried under vacuum at ordinary temperature.

Calculated for $C_{21}H_{20}ClNO + 2\frac{1}{2} H_2O$ (percent): C, 65.8; H, 6.53; N, 3.66; Cl, 9.28. Found (percent): C, 66.4, 66.2 H, 6.73, 6.83; N, 3.43, 3.48; Cl, 9.12, 9.42.

This dyestuff gave on the various fibres based on acrylonitrile polymers a full-bodied and very bright orange shade which had an extraordinary fastness to light.

EXAMPLE 2

The procedure is as in the preceding example, but 10 parts of dimethyl sulphate are additionally added. A strong smell of methylmercaptan is noted during the boiling. After two to four hours heating, the reaction mass is treated as in Example 1 and 5 parts of purified dyestuff identical with the previous one are finally recovered.

EXAMPLE 3

On replacing the courmarin in Example 2 with 14 parts of 2,6-dimethyl-4-pyrone-thione, under similar conditions 5 parts of 2′,6′-dimethyl-4′-pyranylidene-2-methine-1,3,3-trimethyl-indolinium chloride are obtained. This dyestuff dyes acrylic fibres an orange shade which is a little more yellowish than the preceding one.

EXAMPLE 4

The procedure is as in Example 2, but the methyl sulphate is replaced by 15 parts by volume of ethyl chloracetate and the boiling is extended to 15 hours. The mixture is then diluted with 600 parts of cold water, 0.2 part of decolorising characoal are added to separate some gummy impurities, the filtrate is made acid to Congo red by the addition of hydrochloric acid and is finally salted out with 200 parts of sodium chloride. The dyestuff at once crystallises. After standing for one hour, it is filtered, washed with a little 10% brine, drained and dried. 25 parts of a dyestuff identical with that of Examples 1 and 2 are thus obtained.

EXAMPLE 5

A mixture of 8 parts of 2-coumarin-thione, 8 parts of 1,3,3 - trimethyl-2-methylene-5-methoxy-indoline, 6 parts by volume of ethyl chloracetate and 48 parts of glacial acetic acid is heated under reflux for 5 hours. It is then poured into 400 parts of cold water, 0.2 part of decolorising charcoal are added, and it is filtered. 25 parts by volume of 10 N hydrochloric acid and 60 parts of sodium chloride are added to the filtrate. The dyestuff crystallises in the form of brilliant red leaflets. Weight after filtration and drying at 60° C.: 11.2 parts. Its aqueous and alcoholic solutions are red. Its dyes fibres based on acrylonitrile polymers a bright red shade having excellent general fastness, especially to light.

EXAMPLE 6

A mixture comprising 18 parts of 4-methyl-2-coumarin-thione, 17 parts of 1,3,3-trimethyl-2-methylene-indoline, 15 parts of ethyl chloracetate and 100 parts of glacial acetic acid is treated as in Example 5. A dyestuff is thus obtained with a shade very similar to that from Examples 1, 2 and 4. In order to obtain it quite pure it is expedient to recrystallise it from hot water in the presence of decolorising charcoal on account of the presence of traces of a green-blue secondary dyestuff due to the reactivity of the methyl group in the 4 position.

The thione used in this example and not yet described may be prepared in the following way: A mixture comprising 10 parts of 4-methyl-coumarin and 10 parts of phosphorus pentasulphide is heated at 120° C. for 90 minutes. The mass is extracted with toluene, the toluene is driven off in vacuo and the residue is recrystallised from 50% ethyl alcohol. 4.4 parts of 4-methyl-2-coumarinthione are thus obtained having the form of brilliant deep garnet-coloured needles, M.P. 116–117° C.

EXAMPLE 7

35.7 parts of 2,3-dimethyl-benzopyrylium chloroferrate, 20 parts of 2-formylmethylene-1,3,3-trimethyl-indoline, and 1000 parts by volume of absolute ethanol are heated under reflux for an hour. The dyestuff precipitated in the form of deep blue crystals is filtered off after cooling, washed with alcohol and dried at 65° C. 25 parts of 3'-(3''-methyl-2''-coumarinylidene) - 1' - propene-2-yl-1,3,3-trimethyl-indolinium chloroferrate are obtained. This dyestuff dyes acrylic fibres a violet-blue shade.

EXAMPLE 8

Operating as in Example 7, the benzopyrylium salt is replaced by 40.3 parts of 2,3-dimethyl-naphtho[b]pyrrylium chloroferrate and the quantity of alcohol is doubled. Under the same conditions 13.2 parts of a dyestuff dyeing acrylic fibres a greenish blue shade are obtained.

The naphtho[b]pyrylium salt used in this example and not yet described was prepared in the following way: 34 parts of 2-hydroxyl-1-naphthaldehyde and 36 parts of methylethylketone are introduced into a solution at room temperature of 36 parts of anhydrous ferric chloride in 200 parts of glacial acetic acid. This well stirred mixture is saturated with a stream of dry hydrochloric acid and the bubbling through of this gas is maintained for 4 hours. The salt precipitates gradually from the deep red mass. It is cooled externally, filtered off, washed with acetic acid and dried in vacuo. 34 parts of 2,3-dimethylnaphtho[b]pyrylium chloroferrate are obtained in the form of a beige crystalline powder which is fairly soluble in hot alcohol and sparingly soluble in water.

EXAMPLE 9

On replacing the benzopyrylium salt used in Example 7 by the equivalent quantity of 2,3,6,8-tetramethyl-benzopyrylium chloroferrate, under the same conditions a dyestuff of very similar properties and of a little more blue shade is obtained.

The tetramethylbenzopyrylium salt used in this example is prepared according to the process described in Example 8 from 2-hydroxy-3,5-dimethyl-benzaldehyde.

EXAMPLE 10

A mixture of 16 parts of 2-phenyl-4-methyl-5,7-dimethoxybenzopyrylium chloride [prepared according to G. H. Walker and I. M. Heilbron, Soc. Journal of the Chemical Society London (1925), volume 127, page 688] 10 parts of 2-formylmethylene-1,3,3-trimethyl-indoline, and 250 parts by volume of ethanol is boiled under reflux for 15 minutes. The intense blue mass is diluted with 500 parts of a 5% solution of sodium chloride and allowed to cool while stirring. The dyestuff crystallises in the form of bronzed green needles. It is filtered off, drained and dried at 50° C. 18 parts of 3' - (5'',7'' - dimethoxy - 2''-phenyl-4''-benzo [b] pyrannylidene-1'-propene-2-yl-1,3,3-trimethyl-indolinium chloride are obtained. This dyestuff dyes acrylic fibres a blue shade.

EXAMPLE 11

The benzopyrylium salt in Example 10 is replaced by 14.1 parts of 4,6-diphenyl-2-methyl-pyrylium chloride [prepared according to N. V. Khromox-Borisov and L. A. Gabrilova, J. Ch. Gen., U.R.S.S. 31, 2192 (1961)] and 8 parts of 3'-(2'',4''-diphenyl-6''-pyrannylidene)-1'-propene-2-yl-1,3,3-trimethylindolinium chloride are obtained by the same process. This dyestuff dyes acrylic fibres green blue.

EXAMPLE 12

A solution of 21.2 parts of 2-benzo[f]coumarinthione (or 3-3H-naphtho[2,1-b]pyranne-thione) and 17.3 parts of 1,3,3-trimethyl-2-methylene-indoline in 100 parts of glacial acetic acid and 15 parts of ethyl chloracetate is heated under reflux 4 hours. It is diluted with 1000 parts of hot water, 0.5 part of decolorising charcoal are added, and it is boiled for some moments and then filtered. 20 parts by volume of concentrated hydrochloric acid are added to the filtrate and it is allowed to cool. The 2'-benzo[f]coumarinylidene - 2 - methine - 1,3,3-trimethyl-indolinium chloride is precipitated in the form of glittering brown-red crystals showing under the microscope the form of cross-twinned needles in rosettes. It is filtered off, drained and dried at 60° C. Weight obtained: 26 parts.

This dyestuff dyes fibres based on acrylonitrile polymers a bright red shade having excellent fastness, especially to light.

The 2-benzo[f]coumarinthione used in this example and not yet described may be prepared in the following way:

20 parts of benzo[f]coumarin and 40 parts of phosphorus pentasulphide are heated under reflux in 500 parts by volume of xylene for 6 hours. The mixture is filtered while hot, concentrated to half its initial volume and an equal volume of petrol ether is added. After recrystallisation of the precipitate from ligroin of boiling point between 70° C. and 100° C. 12.3 parts of 2-benzo[f] coumarinthione, M.P. 153° C., are obtained.

The following table groups together other examples of dyestuffs prepared in a similar way to the preceding one.

| Example | Intermediates used | | Shade on acrylic fibres |
|---|---|---|---|
| | Coumarin derivatives | Indoline derivatives of Formula II | |
| 13 | 6-chloro-2-coumarin-thione (or 6-chloro-2-thio-coumarin) M.P. 205° C. (lit. 189° C.). | 1,3,3-trimethyl-2-mrthylene-indoline | Orange. |
| 14 | do | 1,3,3-trimethyl-2-methylene-5-methoxy-indoline. | Red. |
| 15 | 6-bromo-2-coumarinthione, M.P. 213° C. | 1,3,3-trimethyl-2-methylene indoline | Orange. |
| 16 | do | 1,3,3-trimethyl-2-methylene 5-methoxy-indoline. | Red. |
| 17 | 2-benzo[f] coumarinthione | do | Bluish red. |

EXAMPLE 18

13 parts of 2-ethoxy-benzopyrylium fluoborate prepared according to H. Meerwein and co-workers [J. prakt. ch. (2) 147, 283 (1937)] are suspended in 50 parts of dry dioxan. 9 parts of 1,3,3-trimethyl-2-methylene-indoline are introduced in a period of 2 minutes at room temperature, with stirring. The temperature rises of itself to 40° C. The mixture is stirred for half an hour, taken to 80° C. for half an hour and allowed to cool. A crystalline orange precipitate is deposited which is taken up in 50 parts of acetic acid. It is heated until it dissolves, and 10 parts of concentrated hydrochloric acid, then 150 parts of a solution containing 30 parts of sodium chloride are added. The dyestuff of Formula VIII crystallises in the form of fine orange red leaflets which are filtered off, washed with a little 15% brine, drained and dried at 50° C.

Tables I and II below sum up a number of examples of new dyestuffs prepared as in Examples 1, 2, 3 or 18.

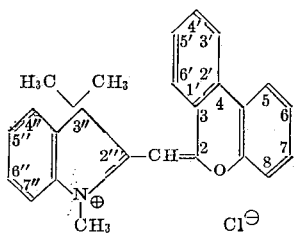

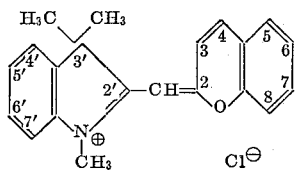

TABLE I

| Example | Substituents | Shade on acrylic fibres |
|---|---|---|
| 19 | 4-methoxy | Bright vermilion. |
| 20 | 4,5'-dimethoxy | Ruby. |
| 21 | 4-methoxy-5'-chloro | Vermilion. |
| 22 | 6-methoxy | Bright vermilion. |
| 23 | 6,5'-dimethoxy | Ruby. |
| 24 | 6-methoxy-5'-chloro | Bright vermilion. |
| 25 | 7-methoxy | Bright bluish red. |
| 26 | 7-methoxy-5'-chloro | Bright scarlet. |
| 27 | 8-methoxy | Orange. |
| 28 | 8,5'-dimethoxy | Red. |
| 29 | 8-methoxy-5'-chloro | Reddish orange. |
| 30 | 3-methyl | Bright orange. |
| 31 | 3-methyl-5'-methoxy | Scarlet. |
| 32 | 3-methyl-5'-chloro | Bright orange. |
| 33 | 4-methyl-7'-methoxy | Scarlet. |
| 34 | 6-methyl-4-methoxy | Red. |
| 35 | 6-methyl-4,5'-dimethoxy | Bordeaux. |
| 36 | 6,8-dimethyl | Bright orange. |
| 37 | 6,8-dimethyl-5'-methoxy | Bright red. |
| 38 | 6,8-dimethyl-5'-chloro | Bright vermilion. |
| 39 | 5'-chloro | Bright orange. |
| 40 | 6,5'-dichloro | Reddish orange. |
| 41 | 6-bromo-5'-chloro | Do. |
| 42 | 3-cyano | Orange. |
| 43 | 6-nitro-5'-methoxy | Red. |
| 44 | 6-nitro-5'-chloro | Orange. |
| 45 | 5.6-benzo-5'-chloro | Ruby. |
| 46 | 3-phenyl | Orange. |
| 47 | 3-phenyl-5'-methoxy | Red. |
| 48 | 3-phenyl-5'-chloro | Scarlet. |
| 49 | 4-phenyl-7-methoxy | Bright bluish red. |

TABLE II

| Example | Substituents | Shade on Acrylic fibres |
|---|---|---|
| 50 | 7-methoxy | Orange. |
| 51 | 7,5'-dimethoxy | Vermilion. |
| 52 | 7,5',5''-trimethoxy | Red. |
| 53 | 7-methoxy-5''-chloro | Orange. |
| 54 | 7,5'-dimethoxy-5''-chloro | Scarlet. |

The following examples describe the preparation of new intermediates which may be used for the preparation of the dyestuffs described in Tables I and II.

EXAMPLE 55

34.8 parts of 6,8-dimethyl-coumarin are dissolved in 100 parts of anhydrous dioxan, 11.7 parts of phosphorus pentasulphide are added, and the mixture is heated for 2 hours at 75 to 80° C. then for 5 hours at 100° C. The hot solution is decanted and poured with agitation on 500 parts of water and ice. The suspension is stirred for 2 hours, filtered, and the solid washed with water until the washings are neutral, drained and dried in vacuo. A first recrystallisation from heptane provided 27 parts of crude 6,8-dimethyl-2-thio-coumarin (M.P. 105° C.) which, after a second recrystallisation from heptane, was in the form of orange needles and melted at 112° C.

*Analysis.*—Calculated for $C_{11}H_{10}OS$ (percent): C, 69.48; H, 5.26; S, 16.84. Found (percent). C, 69.4, 69.6; H, 5.28, 5.23; S, 16.6, 16.5.

Table III indicates the melting points, the solvents for crystallisation and the analytical results relating to a certain number of 2-thio-coumarins not yet described and prepared by an analogous process. They are in the form of more or less deep orange crystals with a distinct melting point.

TABLE III

| Example | Name of the compound | Solvent of crystallisation | M.P. (°C.) | Calculated C | Calculated H | Calculated S | Found C | Found H | Found S |
|---|---|---|---|---|---|---|---|---|---|
| 56 | 4-methoxy-2-thiocoumarin | Benzene | 135 | 62.5 | 4.16 | 16.6 | 62.3 | 4.36 | 16.2 |
| 57 | 6-methoxy-2-thio-coumarin | Ethanol | 131-2 | 62.5 | 4.16 | 16.6 | 62.8 | 4.8 | 17.0 |
| 58 | 8-methoxy-2-thio-coumarin | Ligroin (70-100) | 117 | 62.5 | 4.16 | | 62.75 | 4.38 | |
| 59 | 3-methyl-2-thio-coumarin | do | 130 | 68.2 | 4.54 | 18.18 | 68.8 | 5.20 | 17.9 |
| 60 | 4-methyl-2-thio-coumarin | do | 116-7 | 68.2 | 4.54 | 18.18 | 68.5 | 4.81 | 17.8 |
| 61 | 4-methyl.6-methoxy-2-thio-coumarin | Ethanol | 174 | 64.1 | 4.85 | | 64.1 | 5.29 | |
| 62 | 3-phenyl-2-thio-coumarin | Petrol ether | 103 | 75.65 | 4.20 | 13.43 | 75.9 | 4.25 | 12.8 |
| 63 | 8-methoxy-5H-dibenzo [b,d]-5 pyranne thion. | Benzene | 154 | 69.42 | 4.13 | 13.22 | 69.55 | 4.42 | 12.7 |
| 64 | 3,8-dimethoxy-5H-dibenzo [b,d]-5- pyranne-thion. | Ethanol | 144 | 66.17 | 4.42 | | 65.6 | 4.78 | |

The 4-phenyl-7-methoxy-coumarin used as intermediate was prepared by the action of methyl sulphate on the corresponding 7-hydroxy derivative in aqueous alkaline solution. The crude product recrystallised successively from ethyl alcohol, then from toluene, melted at 145–146° C.

*Analysis.*—Calculated for $C_{16}H_{12}O_3$ (percent): C, 76.2; H, 4.76. Found (percent): C, 76.1, 76.2; H, 4.84, 4.74.

We claim:
1. A dyestuff of the formula:

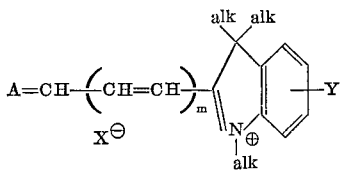

wherein $m$ is 0 1, alk is methl or ethyl, $X^{\ominus}$ represents a monovalent anion, Y is hydrogen, chlorine or methoxy, and A represents the 2- or 4-pyrannylidene, 2-coumarinylidene, 4-benzo[b]pyrannylidene, 5-benzo[c]coumarinylidene or 2-benzo[f]coumarinylidene radicals which may be substituted by 1 to 3 chlorine or bromine atoms or methyl, methoxy, cyano, nitro or phenyl groups.

2. The dyestuff of the formula:

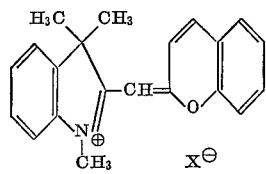

wherein $X^{\ominus}$ represents $Cl^{\ominus}$.

3. The dyestuff of the formula:

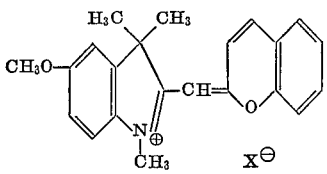

wherein $X^{\ominus}$ represents $Cl^{\ominus}$.

4. The dyestuff of the formula:

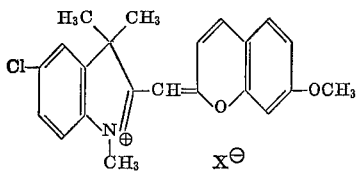

wherein $X^{\ominus}$ represents $Cl^{\ominus}$.

5. The dyestuff of the formula:

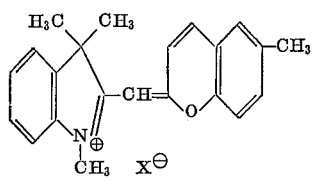

wherein $X^{\ominus}$ represents $Cl^{\ominus}$.

6. The dyestuff of the formula:

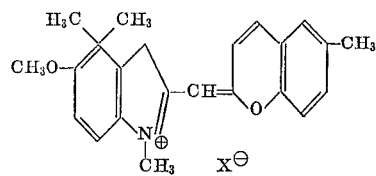

wherein $X^{\ominus}$ represents $Cl^{\ominus}$.

7. Process for the preparation of a dyestuff of the formula given in claim 1 in which $m$ is zero which comprises heating, at a temperature near to boiling point and in the presence of acetic or propionic acid, a 1,3,3-trialkyl-2-methylene indoline of the formula:

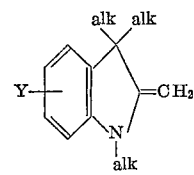

wherein alk is methyl or ethyl and Y is hydrogen, chlorine or methoxy, with a thione of the formula:

$$A = S$$

wherein A represents the 2- or 4-pyrannylidene, 2- coumarinylidene, or 4 - benzo[b]pyrannylidene, 5-benzo[c]coumarinylidene or 2-benzo[f]coumarinylidene radicals which may be substituted by 1 or 2 chlorine or bromine atoms or methyl, methoxy or phenyl group.

8. Process according to claim 7 wherein the condensation is effected in the presence of an alkylating agent in which the alkyl group has one or two carbon atoms.

9. Process according to claim 8 wherein the alkylating agent is present in an amount equal to or greater than the stoichiometric quantity.

References Cited

UNITED STATES PATENTS 2,965,486  12/1960  Brooker et al. _____ 260—240 X

FOREIGN PATENTS 596,243  4/1960  Canada _____ 260—240

OTHER REFERENCES

Kiprianov et al.: Zhur. Obsch. Khim., vol. 30, pp. 638 to 646 (1960).

Hamer: The Cyanine Dyes and Related Compounds, pp. 58 to 59, Interscience Publishers, Inc. (1964).

JOHN D. RANDOLPH, Primary Examiner

U.S. Cl. X.R.

8—177